US012775749B2

(12) United States Patent
Khatri et al.

(10) Patent No.: US 12,775,749 B2
(45) Date of Patent: Oct. 27, 2026

(54) PROTECTION OF PROCESSING DEVICES HAVING MULTI-PORT HARDWARE COMPONENTS

(71) Applicant: Dell Products L.P., Round Rock, TX (US)

(72) Inventors: Mukund P. Khatri, Austin, TX (US); Senthilkumar Ponnuswamy, San Jose, CA (US); Eugene David Cho, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 17/973,788

(22) Filed: Oct. 26, 2022

(65) Prior Publication Data

US 2024/0143850 A1 May 2, 2024

(51) Int. Cl.
*G06F 21/85* (2013.01)
*G06F 21/44* (2013.01)

(52) U.S. Cl.
CPC .............. *G06F 21/85* (2013.01); *G06F 21/44* (2013.01)

(58) Field of Classification Search
CPC ................................. G06F 21/85; G06F 21/44
See application file for complete search history.

(56) References Cited

U.S. PATENT DOCUMENTS 8,607,310 B2 * 12/2013 Holovacs ................ G06F 21/73 726/4
11,586,536 B1 * 2/2023 Jha ...................... G06F 21/6218
2005/0265084 A1 * 12/2005 Choi ........................ H04N 5/44 365/189.04
2009/0271851 A1 * 10/2009 Hoppe .................... G06F 21/31 726/6
2011/0307891 A1 * 12/2011 Orr ....................... G06F 1/3215 718/100
2014/0230078 A1 * 8/2014 Graham .................. G06F 21/60 726/30
2018/0039797 A1 * 2/2018 Lambert ............. G06F 13/4282
(Continued)

OTHER PUBLICATIONS

DeMoss, Ray; "Out-of-Band Management for Compute Systems on the Edge"; One Stop Systems Blog; Sep. 13, 2022.
(Continued)

*Primary Examiner* — David J Pearson
*Assistant Examiner* — Daniel Elahian
(74) *Attorney, Agent, or Firm* — Ryan, Mason & Lewis, LLP

(57) ABSTRACT

Techniques are provided for protecting devices having multi-port hardware components. One method comprises obtaining a configuration of a command from a user to an enabled state or a disabled state on a port (e.g., an in-band port or an out-of-band port) of a hardware component of a processing device; automatically sharing credentials of the user with a basic input/output system of the processing device using a secure channel, in response to the obtained configuration; and initiating processing of a given command from a user, associated with a particular port of the hardware component, responsive to an evaluation of the shared user credentials and the given command being in the enabled state on the particular port. Changes with respect to a current enabled state or a current disabled state of a given command may be locked or unlocked.

20 Claims, 11 Drawing Sheets

(56) References Cited

U.S. PATENT DOCUMENTS

| | | | | |
|---|---|---|---|---|
| 2018/0351797 | A1* | 12/2018 | Negahdar | H04L 9/3213 |
| 2020/0099658 | A1* | 3/2020 | Couillard | G09C 1/00 |
| 2020/0304543 | A1* | 9/2020 | Hamlin | H04L 63/0876 |
| 2020/0374142 | A1* | 11/2020 | Tandon | H04L 49/9068 |
| 2021/0266346 | A1* | 8/2021 | Gordon | H04L 63/0245 |
| 2022/0413876 | A1* | 12/2022 | Rajagopal | G06F 9/4411 |
| 2023/0035291 | A1* | 2/2023 | Suski | G06N 20/00 |
| 2023/0205545 | A1* | 6/2023 | Liu | G06F 9/4401 713/2 |
| 2024/0223605 | A1* | 7/2024 | Ravirajh | H04L 63/1475 |

OTHER PUBLICATIONS

Karan, K; "Out-of-Band Management: Server Management Tools in the Data Center"; Published on Dec. 7, 2019.

Xia et al.; "Analysis of Out-of-Band Management Security Based on IPMI Protocol"; Advances in Engineering Research (AER), vol. 132; 2017 Global Conference on Mechanics and Civil Engineering (GCMCE 2017).

* cited by examiner

PROTECTION OF PROCESSING DEVICES HAVING MULTI-PORT HARDWARE COMPONENTS

FIELD

The field relates generally to information processing systems, and more particularly to security in such information processing systems.

BACKGROUND

Many hardware devices support both in-band and out-of-band management capabilities. In-band management of a given device typically refers to sending commands through an operating system of the given device, while out-of-band management typically refers to sending commands outside of the domain of the operating system, for example, using a management controller. In addition, vendors that provide components for such hardware devices may also support both in-band and out-of-band management capabilities, such that in-band commands and out-of-band commands can be treated differently by such a given component. Malicious actors often try to exploit one or both of the in-band and out-of-band management capabilities.

SUMMARY

In one embodiment, a method comprises obtaining a configuration of at least one command from at least one user to a first one of an enabled state and a disabled state on at least one port of a plurality of ports of at least one hardware component of at least one processing device comprising a processor coupled to a memory; automatically sharing one or more credentials of the at least one user with a basic input/output system of the at least one processing device using a secure channel, in response to the obtained configuration; and initiating processing of a given command from the at least one user, associated with a particular one of the plurality of ports of the at least one hardware component, responsive at least in part to an evaluation of the shared one or more user credentials and the given command being in the enabled state on the particular port. The plurality of ports may comprise an in-band port and an out-of-band port.

In some embodiments, the at least one command may be automatically configured to a second one of the enabled state and the disabled state on at least one different one of the plurality of ports. The enabled state of a particular command may be automatically changed to a disabled state after a designated time period following the obtaining the configuration. In addition, changes may be locked or unlocked with respect to a current enabled state or a current disabled state of at least one command.

In at least one embodiment, the basic input/output system provides one or more of the enabled state and the disabled state of the at least one command, on one or more of the plurality of ports, to an operating system of the at least one processing device using a designated format. The operating system may disable one or more commands having the disabled state for a specific port of the plurality of ports on a management interface of the at least one processing device.

In one or more embodiments, a list of commands, maintained by the at least one hardware component, may be updated in the first state to include the at least one command. The at least one hardware component may not process a particular command, associated with a specific port of the plurality of ports, on a disallowed command list for the specific port.

Other illustrative embodiments include, without limitation, apparatus, systems, methods and computer program products comprising processor-readable storage media.

DETAILED DESCRIPTION

Figure 1A:
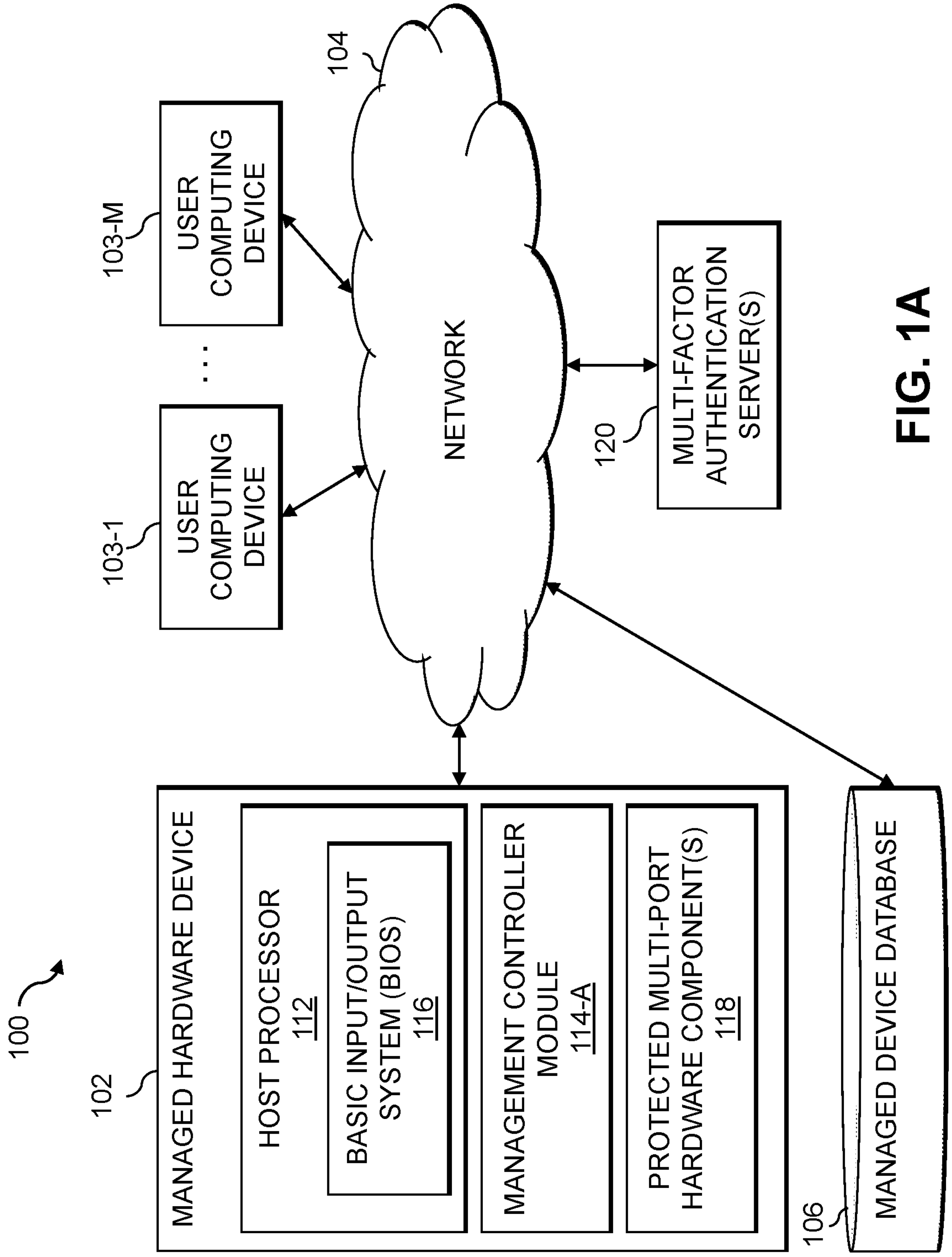
FIGS. 1A and 1B illustrate information processing systems configured to protect devices having multi-port hardware components in accordance with illustrative embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for protecting devices having hardware components with multiple ports.

As noted above, many hardware devices, and a number of components within such hardware devices, support both in-band and out-of-band management capabilities. Privileged commands (e.g., sensitive commands, such as data destruction operations) may be enabled or disabled for a given hardware device on one or both of the in-band and out-of-band paths. For example, certain commands may be enabled on an in-band path and/or on an out-of-band path by adding such commands to an "allow" list maintained by a given hardware component, or may be disabled on an in-band path and/or on an out-of-band path by adding such commands to a "disallow" list maintained by the given hardware component. In some implementations, high-privilege capabilities can be disabled most of the time (for example, by default).

In some embodiments, such command restrictions on the in-band path and/or on the out-of-band path can be enforced, for example, by a processor of a given hardware device (for example, by disabling disabled commands in a user interface), and/or by specific components within the given hardware device (for example, by preventing an execution of any commands on the disallow list).

In addition, an enabled state and/or a disabled state for a given command can be "locked" (e.g., to prevent any changes to such enabled state and/or disabled state) or "unlocked" (e.g., to permit changes to such enabled state and/or disabled state). In one or more implementations, a basic input/output system can expose the current expected state of the unlocked/locked status of a given hardware device or multi-port component, for example, with respect to privileged commands, such as sensitive management capabilities. For example, an Advanced Configuration and Power Interface (ACPI) method may be employed by the basic input/output system to expose the current expected state of the unlocked/locked status for one or more commands.

In one or more embodiments, the disclosed multi-port device protection techniques automatically share user credentials (e.g., session and/or access control information), for example, in connection with a configuration change that impacts an unlocking or an enabling of one or more of the in-band and out-of-band paths of a given hardware device, with the basic input/output system of the given hardware device using a secure channel (e.g., an encrypted channel), such that the user credentials are available in both the in-band and out-of-band domains.

Among other benefits, the disclosed techniques for protecting devices having multi-port hardware components protect devices from unauthorized and/or malicious acts, by allowing an authorized user to specify and/or control the enabled status of certain commands on both the in-band path and the out-of-band path. For example, when a user configures one or more commands to an enabled state or a disabled state on one of the in-band and out-of-band paths, the one or more commands may be automatically configured to the other one of the enabled state and the disabled state on the second path.

Figure 1B:
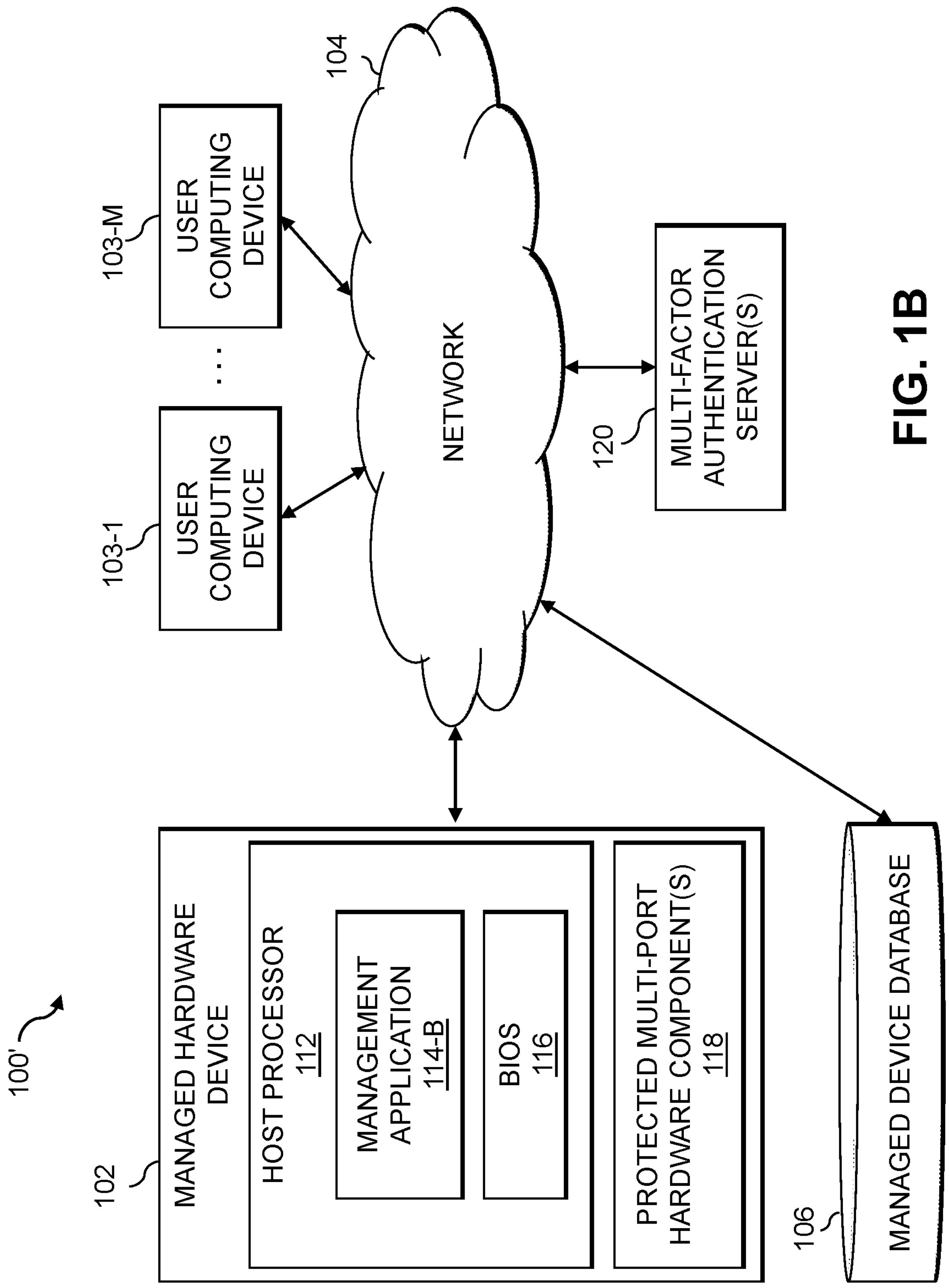

FIGS. 1A and 1B illustrate computer networks (also referred to herein as information processing systems) 100, 100' configured to protect devices having multi-port hardware components in accordance with an illustrative embodiment. The computer network 100 comprises a plurality of user computing devices 103-1 through 103-M, collectively referred to herein as user computing devices 103. The user computing devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIGS. 1A and 1B embodiments. Also coupled to network 104 is one or more managed hardware devices 102, one or more databases 106, and one or more multi-factor authentication servers 120, discussed below.

The managed hardware devices 102 and/or user computing devices 103 may comprise, for example, host devices, storage appliances and/or devices such as mobile telephones, laptop computers, tablet computers, desktop computers or other types of computing devices. Such devices are examples of what are more generally referred to herein as "processing devices." Some of these processing devices are also generally referred to herein as "computers." The managed hardware devices 102 and/or user computing devices 103 may comprise a network client that includes networking capabilities such as ethernet, Wi-Fi, etc. When the managed hardware devices 102 and/or user computing devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1A, an exemplary managed hardware device 102 may comprise a host processor 112, a management controller module 114-A and one or more protected multi-port hardware components 118. The host processor 112 provides a basic input/output system 116. In the example of FIG. 1A, the management controller module 114-A is assumed to be implemented as a dedicated baseboard management controller (BMC), such as the Integrated Dell Remote Access Controller (iDRAC), commercially available from Dell Technologies, or another out-of-band (OOB) controller, as discussed further below in conjunction with FIGS. 2A, 3 and 4, for example.

The protected multi-port hardware components 118 may comprise, for example, a hard drive, a graphics processing unit, a data processing unit, a network interface card and/or other peripheral component interconnect cards.

It is to be appreciated that this particular arrangement of elements 112, 114-A, 116, 118 illustrated in the managed hardware device 102 of the FIG. 1A embodiment is presented by way of example only, and alternative arrangements can be used in other embodiments. For example, the functionality associated with elements 112, 114-A, 116, 118 in other embodiments can be combined into a single element, or separated across a larger number of elements. As another example, multiple distinct processors can be used to implement different ones of elements 112, 114-A, 116, 118 or portions thereof.

At least portions of elements 112, 114-A, 116, 118 may be implemented at least in part in the form of software that is stored in memory and executed by a processor. An exemplary process utilizing elements 112, 114-A, 116, 118 of the managed hardware device 102 in computer network 100 will be described in more detail with reference to FIGS. 2A, 3, 4 and 6, for example.

In the example of FIG. 1B, a management application 114-B that executes on the host processor 112 is assumed to be implemented as a software application that executes the functions of a baseboard management controller, such as the iDRAC, referenced above. The other elements of FIG. 1B are assumed to be implemented in some embodiments in the same or a similar manner as the like-numbered elements of FIG. 1A and are not separately discussed herein.

The term "management controller," as used herein, is intended to be broadly construed to encompass a dedicated management controller, such as management controller module 114-A, or a management application, such as management application 114-B, as would be apparent to a person of ordinary skill in the art.

Other managed hardware devices 102 (not shown in FIGS. 1A and 1B) are assumed to be configured in a manner similar to that shown for managed hardware device 102 in the figure.

The multi-factor authentication server 120 may be implemented, for example, on the cloud, such as a private cloud, or on the premises of an enterprise or another entity. In some embodiments, the multi-factor authentication server 120, or portions thereof, may be implemented as part of a host device.

Additionally, the managed hardware device 102, user computing devices 103 and/or the multi-factor authentication server 120 can have an associated database 106 configured to store, for example, information related to various managed devices, such as one or more managed hardware devices 102, such as device locations, network address assignments and performance data.

The database 106 in the present embodiment is implemented using one or more storage systems associated with the multi-factor authentication server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more managed hardware devices 102, user computing devices 103 and/or multi-factor authentication servers 120 may be implemented on a common processing platform, or on separate processing platforms. The managed hardware devices 102 and/or user computing devices 103 may be configured to interact over the network 104 in at least some embodiments with the multi-factor authentication server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more managed hardware devices 102, user computing devices 103 and/or multi-factor authentication servers 120 can be one or more input-output devices (not shown), which illustratively comprise keyboards, displays or other types of input-output devices in any combination. Such input-output devices can be used, for example, to support one or more user interfaces to the managed hardware devices 102 and/or the multi-factor authentication server 120, as well as to support communications between the managed hardware devices 102, multi-factor authentication server 120 and other related systems and devices not explicitly shown. The one or more managed hardware devices 102, user computing devices 103 and/or multi-factor authentication servers 120 in the FIGS. 1A and 1B embodiments are assumed to be implemented using at least one processing device. Each such processing device generally comprises at least one processor and an associated memory, and implements one or more functional modules for controlling certain features of the respective device.

More particularly, the one or more managed hardware devices 102, user computing devices 103 and/or multi-factor authentication servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more managed hardware devices 102, user computing devices 103 and/or multi-factor authentication servers 120 to communicate in some embodiments over the network 104 with each other (as well as one or more other networked devices), and illustratively comprises one or more conventional transceivers.

It is to be understood that the particular set of elements shown in FIGS. 1A and 1B for multi-port device protection is presented by way of illustrative example only, and in other embodiments additional or alternative elements may be used. Thus, another embodiment includes additional or alternative systems, devices and other network entities, as well as different arrangements of modules and other components.

Figure 2A:
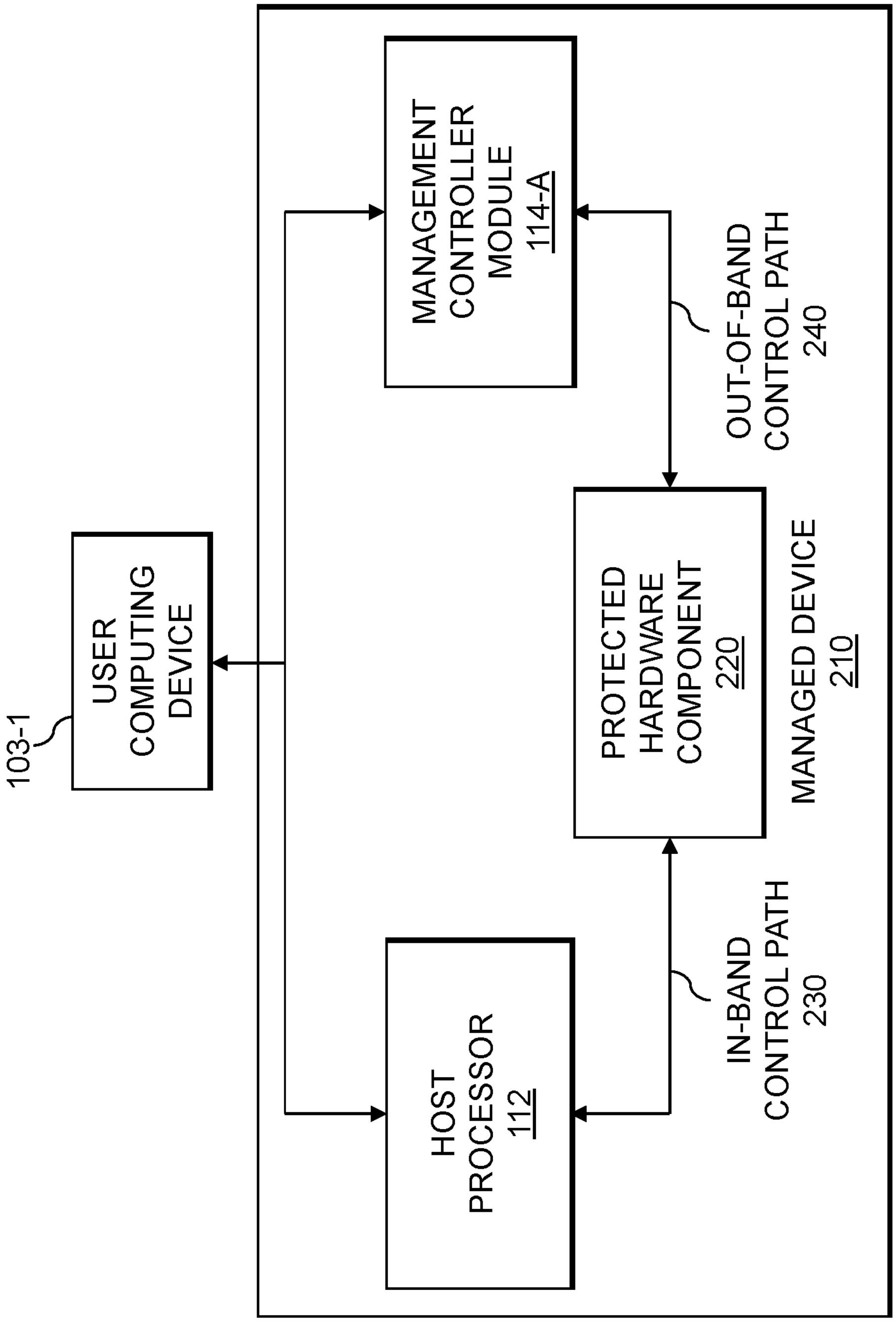
FIGS. 2A and 2B illustrate an in-band control path and an out-of-band control path for respective managed devices in accordance with illustrative embodiments.
Figure 2B:
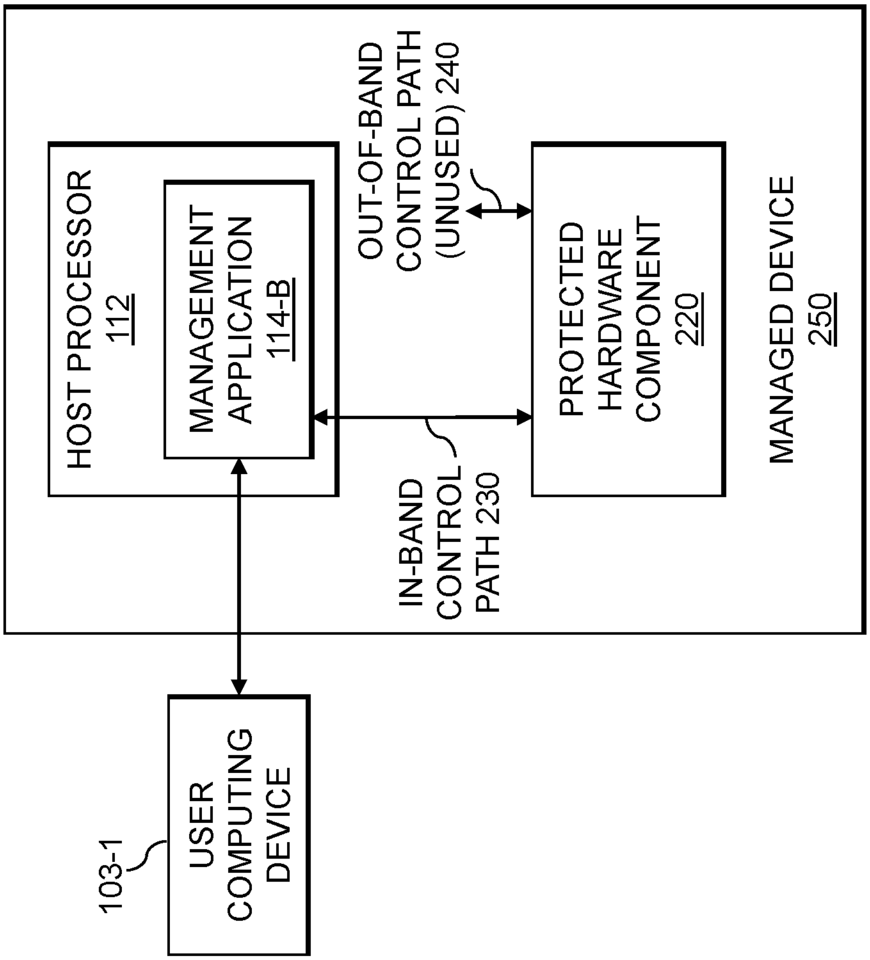

FIGS. 2A and 2B illustrate an in-band control path 230 and an out-of-band control path 240 for respective managed devices 210, 250 in accordance with illustrative embodiments. In the example of FIG. 2A, a user of user computing device 103-1 submits one or more commands for a protected hardware component 220 to managed device 210 using (i) an in-band control path 230 to the protected hardware component 220, by interacting with host processor 112, and/or (ii) an out-of-band control path 240 to the protected hardware component 220, by interacting with management controller module 114-A.

In the example of FIG. 2B, a user of user computing device 103-1 submits one or more commands for a protected hardware component 220 to managed device 250 using an in-band control path 230 to the protected hardware component 220, by interacting with a management application 114-B executing on host processor 112. The out-of-band control path 240 to the protected hardware component 220 is not used in the embodiment of FIG. 2B.

Figure 3:
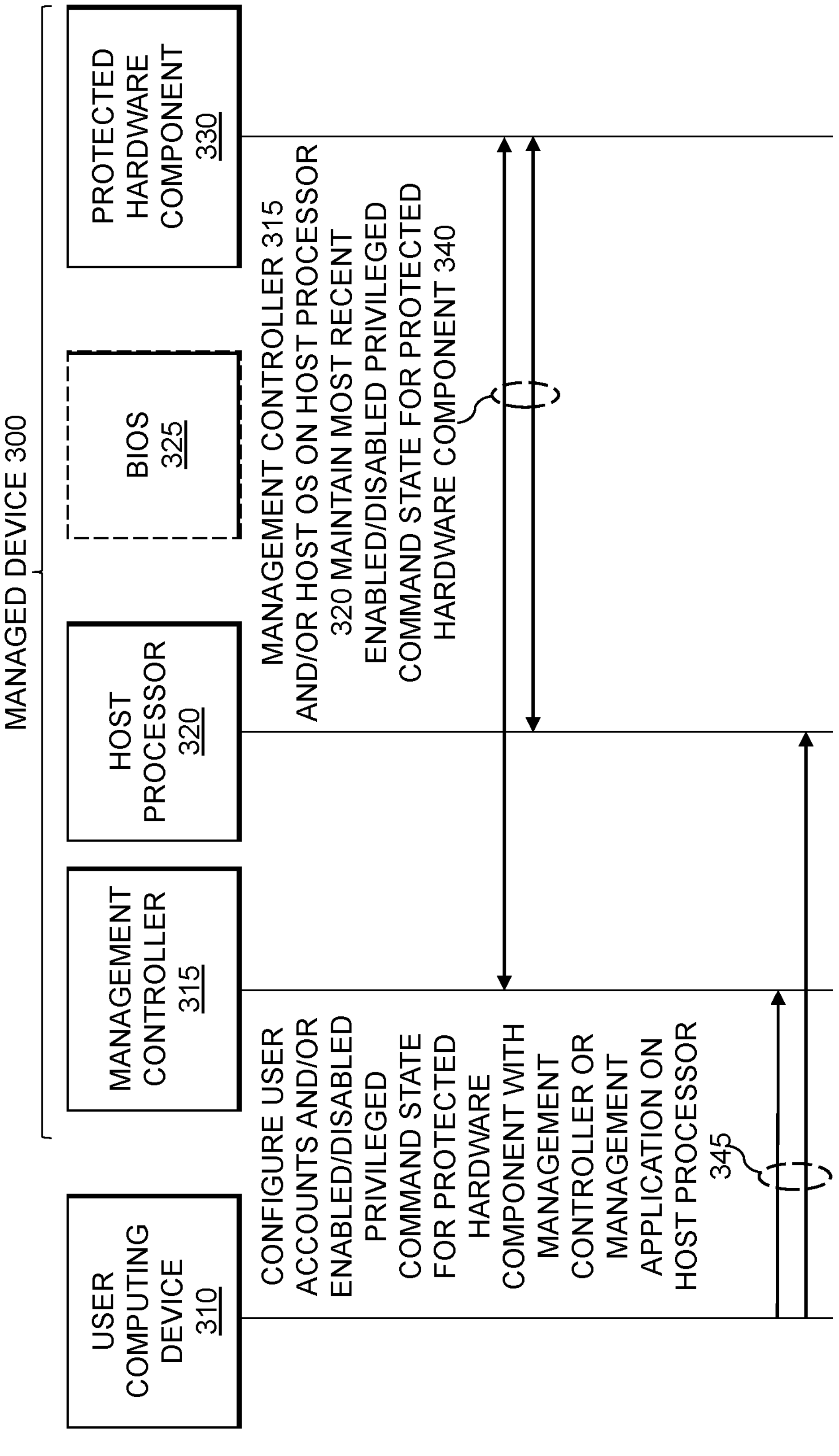
FIG. 3 is a communication diagram illustrating a user configuring one or more user accounts and/or an enabled state of one or more privileged commands or actions in accordance with an illustrative embodiment.

FIG. 3 is a communication diagram illustrating a user of a user computing device 310 configuring one or more user accounts and/or an enabled state of one or more privileged commands or actions for a managed device 300 in accordance with an illustrative embodiment. In the example of FIG. 3, a management controller 315 and/or a host operating system (OS) of the host processor 320 maintain a most recent enabled/disabled privileged command state in step 340 for a protected hardware component 330 (e.g., a hard drive, a graphics processing unit, a data processing unit, a network interface card or other peripheral component interconnect cards).

In step 345, the user of the user computing device 310 configures one or more user accounts and/or an enabled/disabled privileged command state for the protected hardware component 330 with the management controller 315 or with a management application (not shown in FIG. 3) executing on the host processor 320.

The BIOS 325 of the managed device 300 is not addressed in the example of FIG. 3, and is discussed further below in conjunction with FIGS. 4 and 5, for example.

Figure 4:
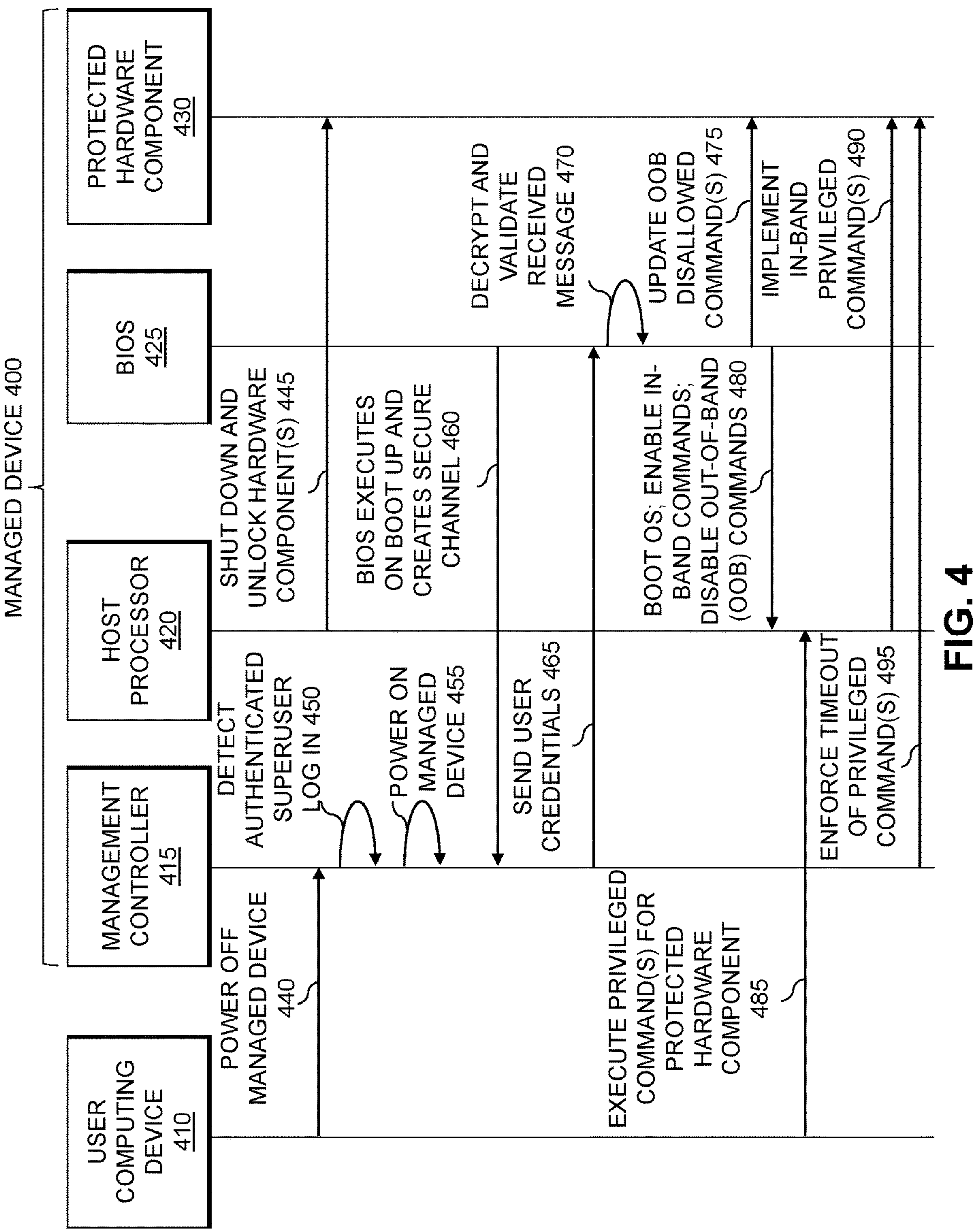
FIG. 4 is a communication diagram illustrating a user configuring a managed device to enable one or more privileged commands on the in-band control path of the managed device in accordance with an illustrative embodiment.

FIG. 4 is a communication diagram illustrating a user of user computing device 410 configuring a managed device 400 to enable one or more privileged commands on the in-band control path of the managed device 400 in accordance with an illustrative embodiment. In the example of FIG. 4, the user of user computing device 410 powers off the managed device 400 in step 440. In step 445, the host processor 420 shuts down and unlocks the protected hardware component 430.

In step 450, the management controller 415 detects a log in by an authenticated superuser to the powered off managed device 400 (e.g., to enable one or more privileged commands on the in-band control path of the managed device 400). In response, the management controller 415 powers on the managed device 400 in step 455. In step 460, the BIOS 425 executes on boot up of the managed device 400 and creates a secure channel with the management controller 415 (e.g., an encrypted channel, a block transfer or a shared memory).

In step 465, the management controller 415 uses the secure channel to send user credentials (e.g., session and access control information) to the BIOS 425. In response, the BIOS 425 decrypts and validates the received message with the user credentials in step 470, and then updates a list of out-of-band disallowed commands maintained by the protected hardware component 330 in step 475 (e.g., to prevent an execution of privileged commands by the protected hardware component 430 received on the out-of-band path.

In step 480, the BIOS 425 boots the host, enables the one or more privileged commands on the in-band control path of the managed device 400 and disables privileged commands on the out-of-band control path of the managed device 400.

The user of user computing device 410 executes one or more privileged commands with the host processor 420 on the in-band path for the protected hardware component in step 485. In step 490, the host processor 420 implements the one or more privileged commands on the in-band path for the protected hardware component 430. In addition, the management controller 415 optionally enforces a timeout of the privileged commands on the in-band path of the protected hardware component 430 in step 495 to return the privileged commands to a disabled status, for example.

In some embodiments, a user can configure a locked/unlocked status that either locks or unlocks a current enabled or disabled state of a given command, or an enabled or disabled state of multiple commands on an "allowed" or disallowed" list, respectively. In the case of a configured timeout, for example, the BIOS 425 may leave a particular command or an allowed/disallowed list in an "unlocked" state. In the event a timeout has not been configured, the BIOS 425 may lock the ability to modify a particular command or the allow/disallow list (e.g., to prevent an operating system-level malware attack from re-granting itself the ability to perform a privileged command).

Figure 5:
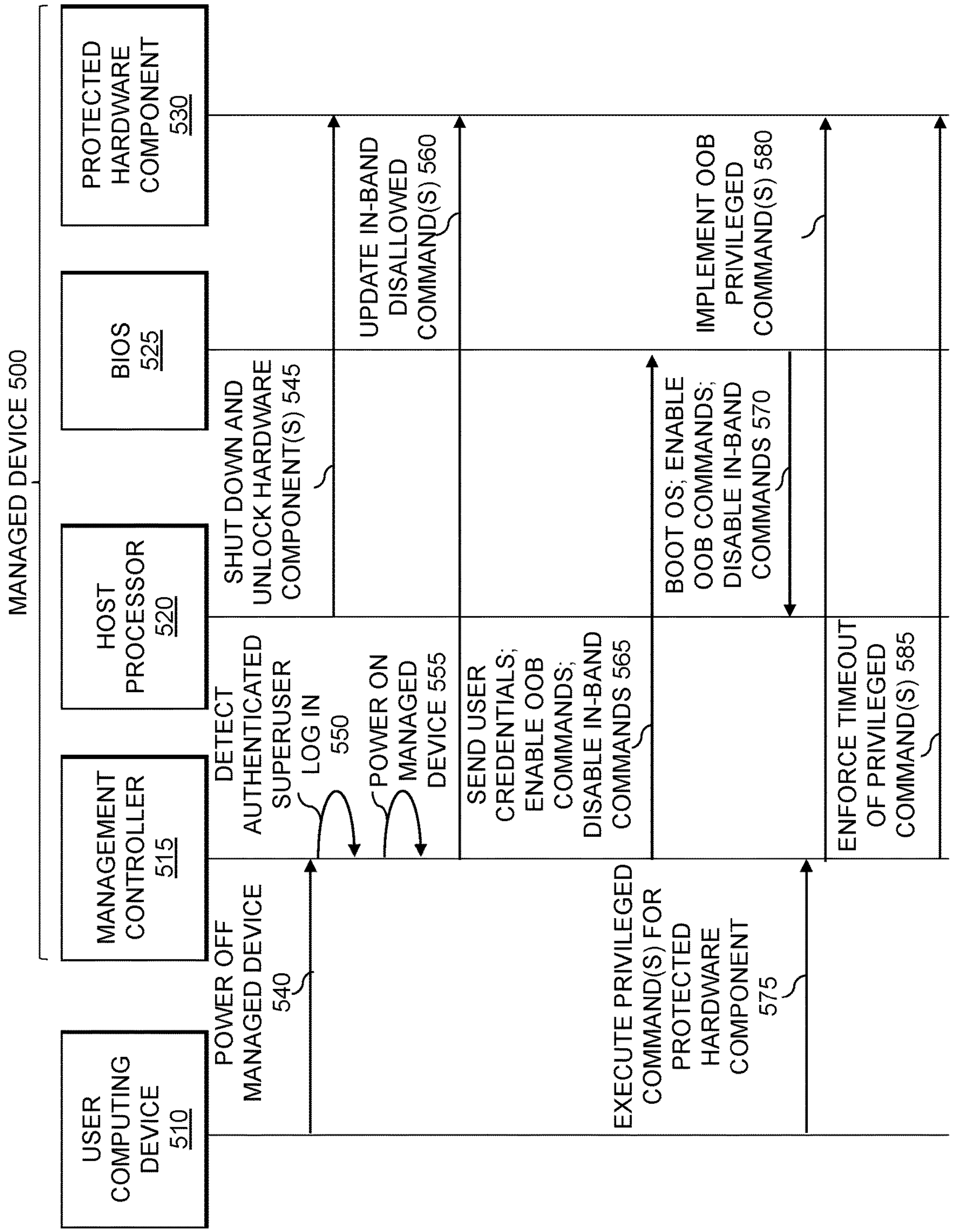
FIG. 5 is a communication diagram illustrating a user configuring a managed device to enable one or more privileged commands on the out-of-band control path of the managed device in accordance with an illustrative embodiment.

FIG. 5 is a communication diagram illustrating a user of user computing device 510 configuring a managed device 500 to enable one or more privileged commands on the out-of-band control path of the managed device 500 in accordance with an illustrative embodiment. In the example of FIG. 5, the user of user computing device 510 powers off the managed device 500 in step 540. In step 545, the host processor 520 shuts down and unlocks the protected hardware component 530.

In step 550, the management controller 515 detects a log in by an authenticated superuser to the powered off managed device 500 (e.g., to enable one or more privileged commands on the out-of-band control path of the managed device 500). In response, the management controller 515 powers on the managed device 500 in step 555.

The management controller 515 updates a list of in-band disallowed commands maintained by the protected hardware component 430 in step 560 (e.g., to prevent an execution of privileged commands by the protected hardware component 530 received on the in-band path).

In step 565, the management controller 515 sends the user credentials (e.g., session and access control information); enables the out-of-band commands and disables the in-band commands 565 with the BIOS 525.

In step 570, the BIOS 525 boots the host OS, enables the one or more privileged commands on the out-of-band control path of the managed device 500 and disables privileged commands on the in-band control path of the managed device 500.

The user of user computing device 510 executes one or more privileged commands with the management controller 515 on the out-of-band path for the protected hardware component 530 in step 575. In step 580, the management controller 515 implements the one or more privileged commands on the out-of-band path for the protected hardware component 530. In addition, the management controller 515 optionally enforces a timeout of the privileged commands on the out-of-band path of the protected hardware component 530 in step 585 to return the privileged commands to a disabled status, for example.

Figure 6:
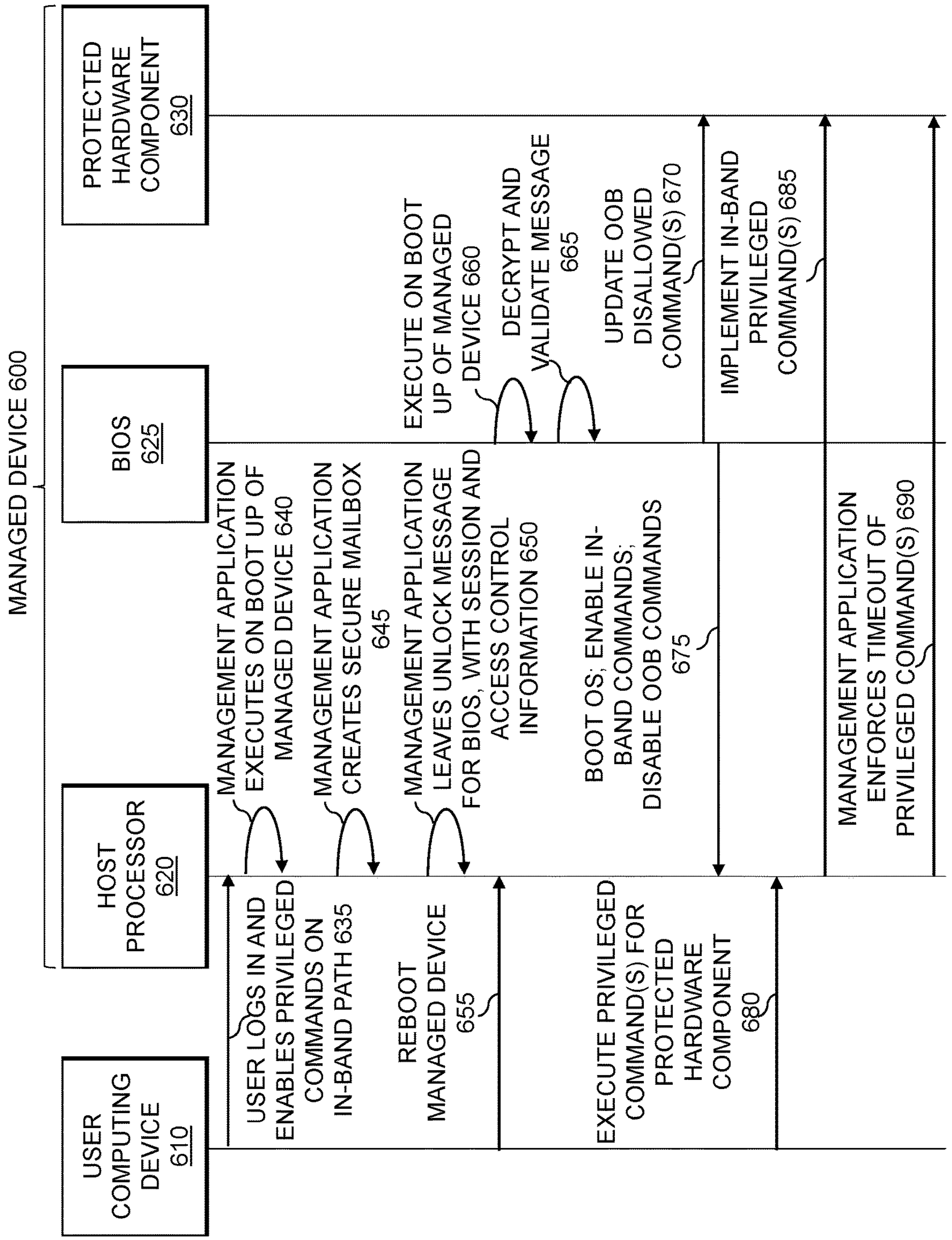
FIG. 6 is a communication diagram illustrating a user configuring a managed device to enable one or more privileged commands on the in-band control path of the managed device using a management application that executes on a host processor in accordance with an illustrative embodiment.

FIG. 6 is a communication diagram illustrating a user configuring a managed device 600 to enable one or more privileged commands on the in-band control path of the managed device 600 using a management application that executes on a host processor 620 in accordance with an illustrative embodiment. In the example of FIG. 6, the user of user computing device 610 logs in and enables one or more privileged commands on the in-band path to the protected hardware component 630 in step 635.

In step 640, the management application that executes on the host processor 620 executes on a boot up of the managed device 600 in step 640. In step 645, the management application creates a secure mailbox, and in step 650 the management application leaves an unlock message for the BIOS 625, with a request to unlock the in-band path for one or more privileged commands, and with session and access control information.

The user of the user computing device 610 then reboots the managed device 600 in step 655. The BIOS 625 will execute upon the boot up of the managed device 600, in step 660, and then decrypt and validate the message from the management application in step 665.

In step 675, the BIOS 625 boots the host processor 620, and enables the one or more privileged commands on the in-band control path of the managed device 600 and disables privileged commands on the out-of-band control path of the managed device 600.

The user of user computing device 610 executes one or more privileged commands with the management application on the host processor 620 on the in-band path for the protected hardware component 630 in step 680. In step 685, the management application on the host processor 620 implements the one or more privileged commands on the in-band path for the protected hardware component 630. In addition, the management application on the host processor 620 optionally enforces a timeout of the privileged commands on the in-band path of the protected hardware component 630 in step 690 to return the privileged commands to a disabled status, for example.

Figure 7:
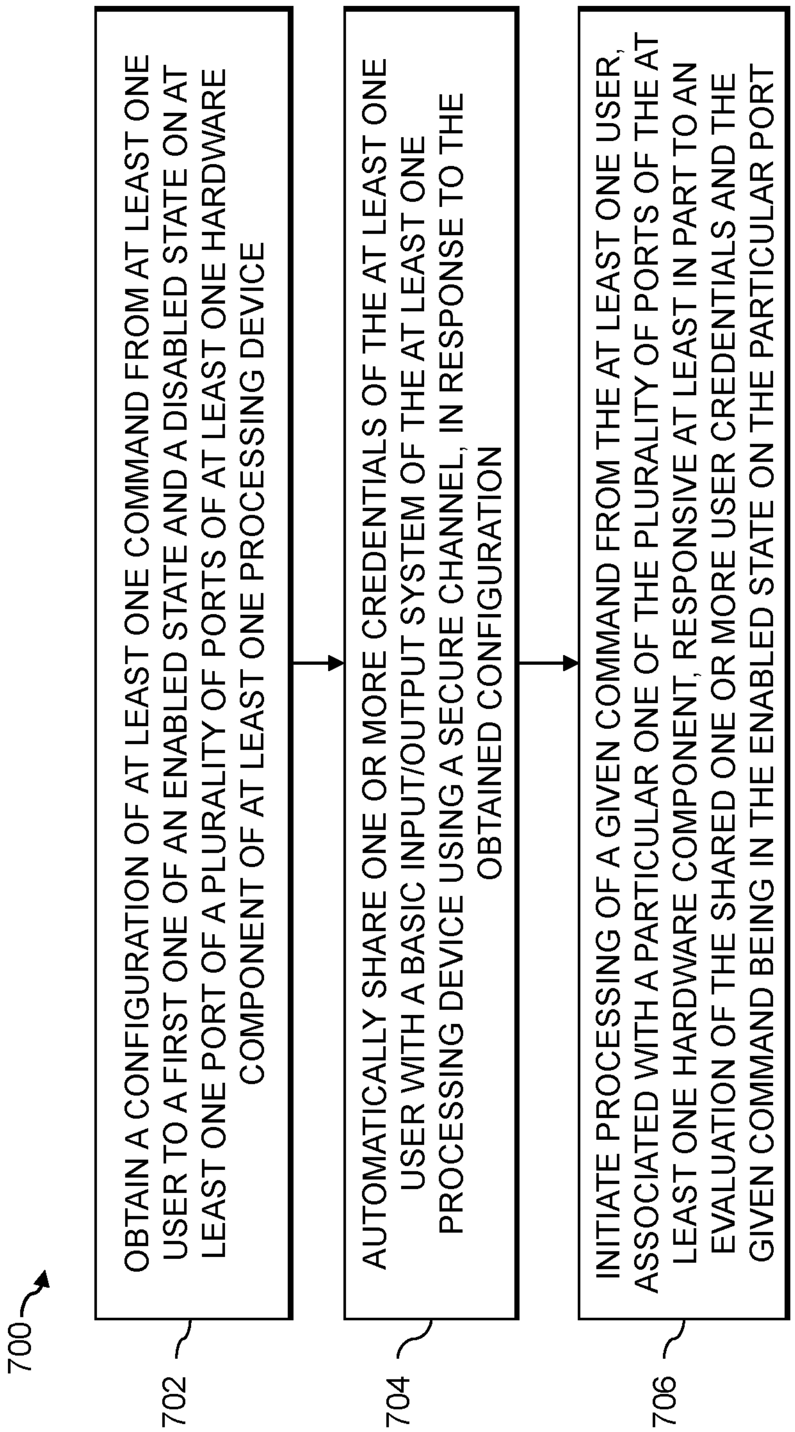
FIG. 7 is a flow chart illustrating an exemplary implementation of a process for protecting devices having multi-port hardware components in accordance with an illustrative embodiment.

FIG. 7 is a flow chart illustrating an exemplary implementation of a process 700 for protecting devices having multi-port hardware components in accordance with an illustrative embodiment. In the example of FIG. 7, the process 700 initially obtains a configuration in step 702 of at least one command from at least one user to a first one of an enabled state and a disabled state on at least one port of a plurality of ports of at least one protected hardware component of at least one processing device.

In step 704, one or more credentials of the at least one user are automatically shared with a basic input/output system of the at least one processing device using a secure channel, in response to the obtained configuration.

A processing of a given command from the at least one user, associated with a particular one of the plurality of ports of the at least one protected hardware component, is initiated in step 706 responsive at least in part to an evaluation of the shared one or more user credentials and the given command being in the enabled state or the disabled state on the particular port. The plurality of ports may comprise an in-band port and an out-of-band port.

In some embodiments, the at least one command may be automatically configured to a second one of the enabled state and the disabled state on at least one different one of the plurality of ports. The enabled state of a particular command may be automatically changed to a disabled state after a designated time period following the obtaining the configuration. In addition, changes with respect to a current enabled state or a current disabled state of one or more specified commands or a list of commands may be locked or unlocked.

In at least one embodiment, the basic input/output system provides one or more of the enabled state and the disabled state of the at least one command, on one or more of the plurality of ports, to an operating system of the at least one processing device using a designated format. The operating system may disable one or more commands having the disabled state for a specific port of the plurality of ports on a management interface of the at least one processing device.

In one or more embodiments, a list of commands, maintained by the at least one protected hardware component, may be updated in the first state to include the at least one command. The at least one protected hardware component may not process a particular command, associated with a specific port of the plurality of ports, on a disallowed command list for the specific port.

The particular processing operations and other network functionality described in conjunction with FIGS. 3 through 7, for example, are presented by way of illustrative example only, and should not be construed as limiting the scope of the disclosure in any way. Alternative embodiments can use other types of processing operations for protecting devices having multi-port hardware components. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for protecting devices having multi-port hardware components can be employed, for example, to control a configuration of one or more commands to an enabled or disabled status on the multiple ports. User credentials can be automatically shared among the in-band and out-of-band paths as part of the configuration. In some embodiments, after enabling one or more commands on an in-band path or an out-of-band path, the alternate path may be automatically configured to a disabled state for the one or more commands. The enabled state of a particular command may be automatically changed to a disabled state after a designated time period following a configuration. In addition, further changes with respect to a current enabled state or disabled state of one or more specified commands or a list of commands may be locked or unlocked.

One or more embodiments of the disclosure provide improved methods, apparatus and computer program products for protecting devices having multi-port hardware components. The foregoing applications and associated embodiments should be considered as illustrative only, and numerous other embodiments can be configured using the techniques disclosed herein, in a wide variety of different applications.

It should also be understood that the disclosed multi-port device protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for protecting devices having multi-port hardware components may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-port device protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-port device protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
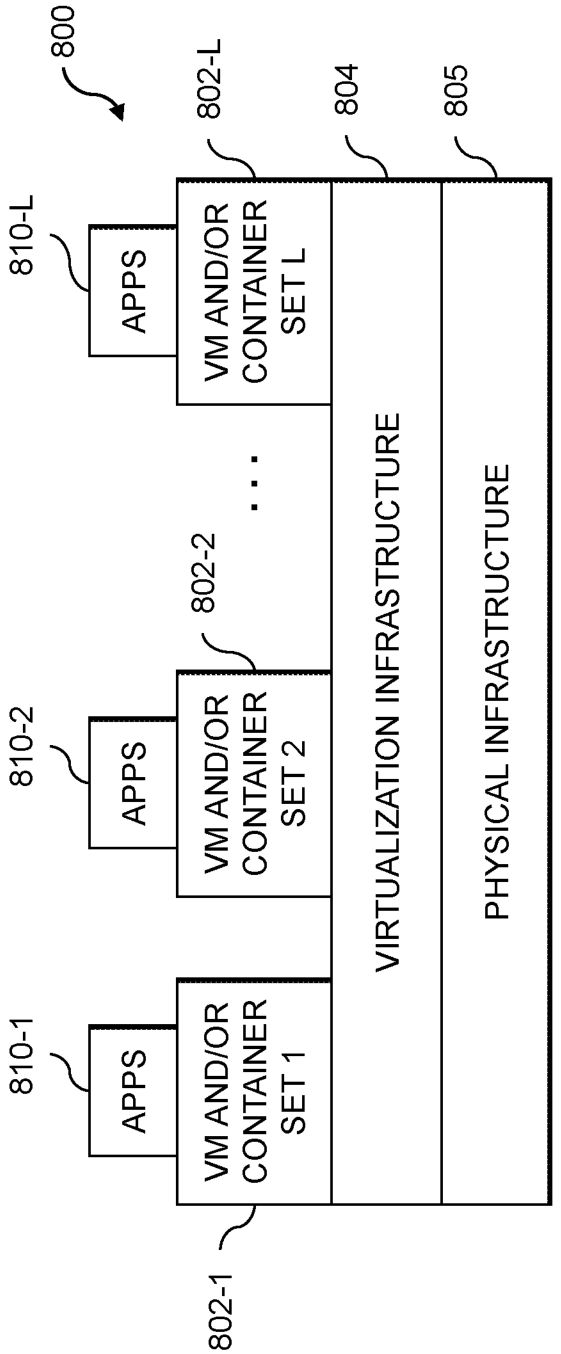
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide multi-port device protection functionality of the type described above for one or more processes running on a given one of the VMs. For example, each of the VMs can implement multi-port device protection control logic and associated per-port command execution control functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide multi-port device protection functionality of the type described above for one or more processes running on different ones of the containers. For example, a container host device supporting multiple containers of one or more container sets can implement one or more instances of multi-port device protection control logic and associated per-port command execution control functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
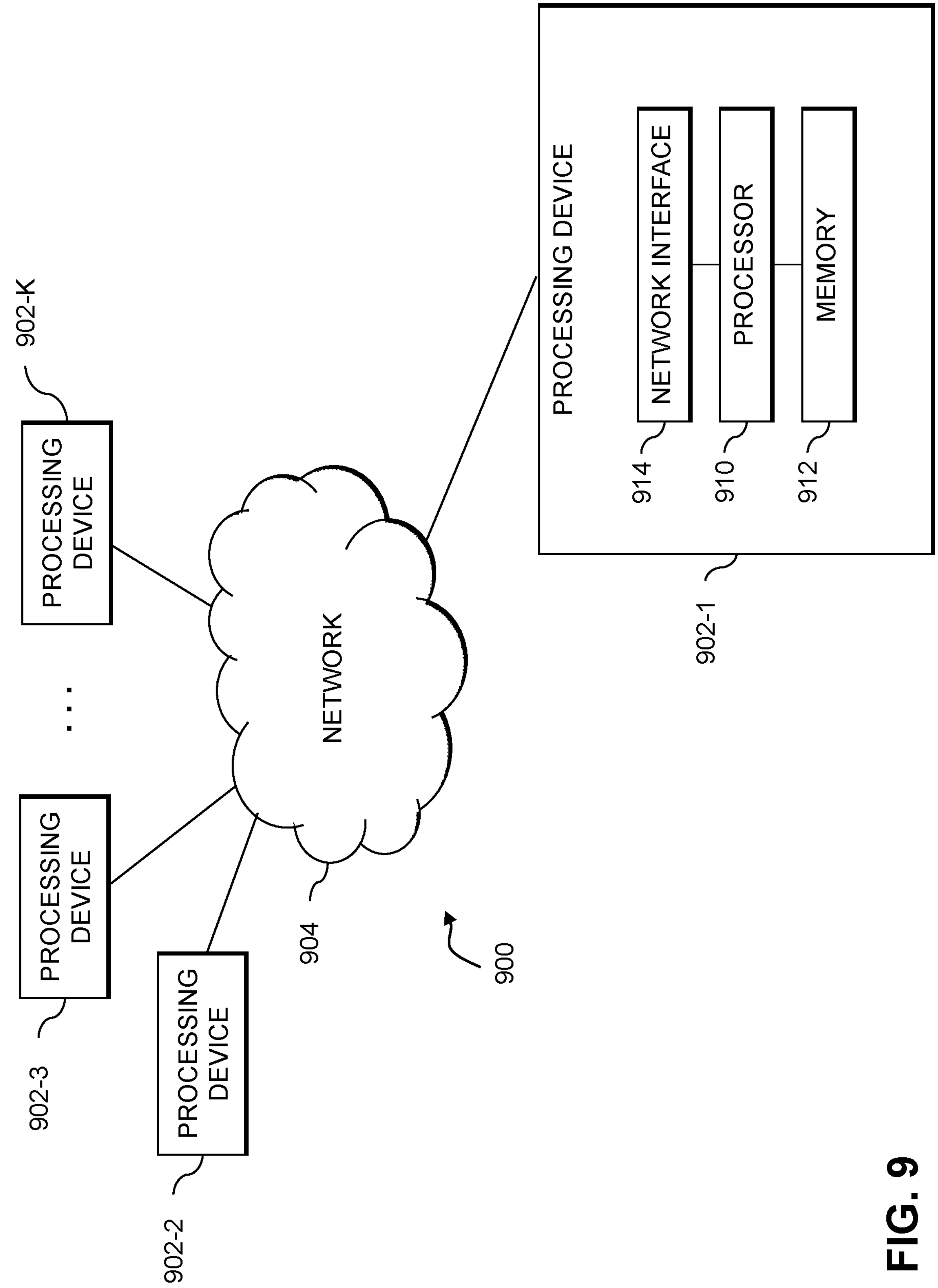
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

configuring at least one command to a first one of an enabled state and a disabled state on at least one port of a plurality of ports of at least one hardware component of a processing device comprising a processor coupled to a memory, wherein a first one of the plurality of ports comprises one or more of (i) an in-band port associated with an in-band control path between at least one processor, of the processing device, and at least one additional hardware component, of the processing device, and (ii) an out-of-band port associated with an out-of-band control path between at least one management controller, of the processing device, and at least one additional hardware component, of the processing device, wherein at least one of the in-band control path and the out-of-band path is within the processing device;

automatically providing, by a given management controller of the processing device, one or more credentials of at least one user to a basic input/output system of the processing device using a secure channel; and initiating processing of a given command, of the at least one command, received from the at least one user, associated with a particular one of the in-band port and the out-of-band port of the at least one hardware component, responsive at least in part to an evaluation of the provided one or more user credentials and the given command being in the enabled state on the particular one of the in-band port and the out-of-band port;

wherein the method is performed by the processing device.

2. The method of claim 1, wherein the configuration of the at least one command to the first state comprises a change in the configuration from a default state.

3. The method of claim 1, further comprising automatically configuring the at least one command to a second one of the enabled state and the disabled state on at least one different one of the plurality of ports.

4. The method of claim 1, wherein the given command comprises one of said at least one command and further comprising determining whether to execute the given command for the at least one hardware component by evaluating whether the given command comprises a command of at least one designated type.

5. The method of claim 1, further comprising providing, by the basic input/output system, one or more of the enabled state and the disabled state of the at least one command, on one or more of the plurality of ports, to an operating system of the processing device using a designated format.

6. The method of claim 5, further comprising disabling, by the operating system of the processing device, one or more commands having the disabled state for a specific port of the plurality of ports on a management interface of the processing device.

7. The method of claim 1, wherein the enabled state of a particular command is automatically changed to a disabled state after a designated time period following the obtaining the configuration.

8. The method of claim 1, further comprising initiating an updating of a list of commands, maintained by the at least one hardware component, in the first state to include the at least one command.

9. The method of claim 8, wherein the at least one hardware component will not process a particular command, associated with a specific port of the plurality of ports, on a disallowed command list for the specific port.

10. The method of claim 1, further comprising locking or unlocking changes with respect to a current enabled state or a current disabled state of at least one command.

11. An apparatus comprising:

at least one processing device comprising a processor coupled to a memory;

the at least one processing device being configured to implement the following steps:

configuring at least one command to a first one of an enabled state and a disabled state on at least one port of a plurality of ports of at least one hardware component of a processing device comprising a processor coupled to a memory, wherein a first one of the plurality of ports comprises one or more of (i) an in-band port associated with an in-band control path between at least one processor, of the processing device, and at least one additional hardware component, of the processing device, and (ii) an out-of-band port associated with an out-of-band control path between at least one management controller, of the processing device, and at least one additional hardware component, of the processing device, wherein at least one of the in-band control path and the out-of-band path is within the processing device;

automatically providing, by a given management controller of the processing device, one or more credentials of at least one user to a basic input/output system of the processing device using a secure channel; and initiating processing of a given command, of the at least one command, received from the at least one user, associated with a particular one of the in-band port and the out-of-band port of the at least one hardware component, responsive at least in part to an evaluation of the provided one or more user credentials and the given command being in the enabled state on the particular one of the in-band port and the out-of-band port.

12. The apparatus of claim 11, further comprising automatically configuring the at least one command to a second one of the enabled state and the disabled state on at least one different one of the plurality of ports.

13. The apparatus of claim 11, further comprising:

providing, by the basic input/output system, one or more of the enabled state and the disabled state of the at least one command, on one or more of the plurality of ports, to an operating system of the processing device using a designated format; and disabling, by the operating system of the processing device, one or more commands having the disabled state for a specific port of the plurality of ports on a management interface of the processing device.

14. The apparatus of claim 11, further comprising initiating an updating of a list of commands, maintained by the at least one hardware component, in the first state to include the at least one command.

15. The apparatus of claim 11, further comprising locking or unlocking changes with respect to a current enabled state or a current disabled state of at least one command.

16. The apparatus of claim 11, wherein the given command comprises one of said at least one command and further comprising determining whether to execute the given command for the at least one hardware component by evaluating whether the given command comprises a command of at least one designated type.

17. A non-transitory processor-readable storage medium having stored therein program code of one or more software programs, wherein the program code when executed by at least one processing device causes the at least one processing device to perform the following steps:

configuring at least one command to a first one of an enabled state and a disabled state on at least one port of a plurality of ports of at least one hardware component of a processing device comprising a processor coupled to a memory, wherein a first one of the plurality of ports comprises one or more of (i) an in-band port associated with an in-band control path between at least one processor, of the processing device, and at least one additional hardware component, of the processing device, and (ii) an out-of-band port associated with an out-of-band control path between at least one management controller, of the processing device, and at least one additional hardware component, of the processing device, wherein at least one of the in-band control path and the out-of-band path is within the processing device;

automatically providing, by a given management controller of the processing device, one or more credentials of at least one user to a basic input/output system of the processing device using a secure channel; and initiating processing of a given command, of the at least one command, received from the at least one user, associated with a particular one of the in-band port and the out-of-band port of the at least one hardware component, responsive at least in part to an evaluation of the provided one or more user credentials and the given command being in the enabled state on the particular one of the in-band port and the out-of-band port.

18. The non-transitory processor-readable storage medium of claim 17, further comprising automatically configuring the at least one command to a second one of the enabled state and the disabled state on at least one different one of the plurality of ports.

19. The non-transitory processor-readable storage medium of claim 17, further comprising:

providing, by the basic input/output system, one or more of the enabled state and the disabled state of the at least one command, on one or more of the plurality of ports, to an operating system of the processing device using a designated format; and disabling, by the operating system of the processing device, one or more commands having the disabled state for a specific port of the plurality of ports on a management interface of the processing device.

20. The non-transitory processor-readable storage medium of claim 17, further comprising locking or unlocking changes with respect to a current enabled state or a current disabled state of at least one command.

* * * * *